United States Patent [19]

Francisco et al.

[11] 4,041,273
[45] Aug. 9, 1977

[54] METHOD FOR VACUUM METAL CLADDING

[75] Inventors: Herbert H. Francisco; Anthony P. Martocci; Sydney B. Beitel, all of Bethlehem, Pa.

[73] Assignee: Bethlehem Steel Corporation, Bethlehem, Pa.

[21] Appl. No.: 624,492

[22] Filed: Oct. 21, 1975

[51] Int. Cl.² .............................................. B23K 9/00
[52] U.S. Cl. ............................................. 219/121 EM
[58] Field of Search ............... 219/121 EM, 121 EB, 219/76; 228/193, 195, 221, 235, 242, 243

[56] References Cited

U.S. PATENT DOCUMENTS

| | | | |
|---|---|---|---|
| 2,668,133 | 2/1954 | Brophy et al. | 219/121 EM X |
| 3,043,728 | 7/1962 | Stauffer | 219/121 EM X |
| 3,161,950 | 12/1964 | Cobb | 219/121 EM X |
| 3,315,548 | 4/1967 | Anderson et al. | 219/121 EM X |
| 3,350,772 | 11/1967 | Ulam et al. | 29/488 |
| 3,417,223 | 12/1968 | Steigerwald | 219/121 EM |
| 3,420,978 | 1/1969 | Webb | 219/121 EM |
| 3,441,709 | 4/1969 | Martocci | 219/121 EM |

Primary Examiner—J. V. Truhe
Assistant Examiner—Fred E. Bell
Attorney, Agent, or Firm—Joseph J. O'Keefe; Michael J. Delaney; Anson W. Biggs

[57] ABSTRACT

A method of bonding strips of metals by a combination of electron beam heating, cleaning and rolling in a vacuum.

10 Claims, 1 Drawing Figure

METHOD FOR VACUUM METAL CLADDING

BACKGROUND OF THE INVENTION

In the joining of steel with a different metal to produce a clapped steel product it is well known that the effectiveness of the bonding forces between two solid metals is adversely affected by the presence of any contaminating material. P. P. Ewald in a publication titled "Structure and Properties of Solid Surfaces," ed. R. Gomer and C. S. Smith (University of Chicago Press), 1953, disclosed a broad distinction between three kinds of surfaces, namely pure surfaces, clean surfaces and technical surfaces. Ewald described such surfaces in decreasing order of cleanliness as follows:

"(1) Pure Surfaces. The surface of a body created in extreme high vacuum, for example by cleavage, or by evaporator, and maintained in a state where no adsorption occurs.

(2) Clean Surfaces. A surface in the course of whose preparation precautions have been taken to remove grease, moisture, etc., by degreasing and heating in moderate vacuum.

(3) Technical Surfaces. A surface of a body which has been in contact with a reactive environment, such as air, grease or other reagents, whether inadvertently or by design."

In addition to the cleanliness of the bonding surfaces of the metals to be joined it is known that the effectiveness of the bond between two different metals is enhanced by (a) the similarity in their atomic arrangements and (b) the roughness of the bonding surfaces.

Examples of prior art methods of commercial cladding of steel with other metals wherein the cleanliness of bonding surfaces fall into the previously mentioned distinctions of (2) clean surfaces and (3) technical surfaces are as follows:

U.S. Pat. No. 2,691,815 issued to H.W. Boessenkool et al for "Solid Phase Bonding of Metals" is directed to a method comprising the steps of preparing, heating, squeezing and reheating. In this method the initial heating step eliminates "films which would otherwise act as a barrier to bonding" and "the prepared surfaces are protected from reformation of any barrier films" by squeezing.

U.S. Pat. No. 2,753,623 issued to H.W. Boessenkool et al for "Solid Phase Bonding of Metals" is directed to a method comprising the steps of heating and squeezing to form discrete bonds and then sintering. In the method of this invention "barrier films" are removed by heating, wire brushing, pickling and heating in a protective atmosphere prior to squeezing and sintering.

U.S. Pat. No. 3,210,840 issued to J. B. Ulam for "Stainless Steel Clad Aluminum and Method of Making Same" is directed to a method of heating the surface of aluminum and stainless steel and bringing the surfaces into contact with one another under pressure sufficient to effect a reduction in the thickness of the stainless steel and aluminum. This patent discloses mechanically cleaning the surfaces to be joined and heating such surfaces in either a vacuum or an inert atmosphere.

U.S. Pat. No. 3,350,772 issued to J. B. Ulam et al for "Method of Cladding Stainless Steel to Aluminum" is directed to a method of forming a composite stainless steel and aluminum strip comprising heating and exerting pressure to form a bond. This patent discloses an atmosphere selected to protect the clean surfaces of the metal from oxidation by the use of either an inert atmosphere, a reducing atmosphere or a vacuum.

In the prior art cladding of one metal with another metal it is the usual practice to roll bond the metal strips with sufficient pressure to produce extensive elongation, typically more than 30%, for at least one of the metals. Under these prior art conditions it may be possible to obtain partial bonding by providing immediate intimate contact between two surfaces exposed by brittle failure of occluded oxides. However, the limited bonding of the prior art methods of cladding requires additional aids to bonding such as roughening the bonding surfaces to produce high-pressure fracture points and a subsequent heat treatment so as to enlarge isolated bonds by diffusion and/or sintering. Subsequent heat treatments may be harmful to the clad product due to the loss of corrosion resistance caused by carbon migration or the creation of brittle intermetallic compounds such as compounds of iron and aluminum and/or iron and zinc.

SUMMARY OF THE INVENTION

The principal object of the present invention is to provide an improved method for bonding a steel strip with a strip of a different metal.

Another object of the present invention is to bond steel strip with strip of a different metal such as aluminum, copper and brass wherein both metals have smooth bonding surfaces.

A further object of the present invention is to clad steel strip with a strip of another metal by creating and maintaining very clean bonding surfaces so that an effective bond is provided by a simple hot rolling step and without any subsequent diffusion heat treating step required by conventional cladding.

A novel method has been discovered in which an impinging stream of electrons will simultaneously clean and heat metal strips for rolling in a vacuum so as to provide a simplified method of cladding metal strips. In the method of this invention the stream of electrons impinges adjacent surfaces of metal strips to clean and heat the metal in preparation for roll bonding. The impinging stream of electrons is effective in removing very small trace amounts of surface contaminants by breaking chemically bonded and dissolved gases such as hydrogen, nitrogen and oxygen, as well as loosening adsorbed moisture and other solvents. In addition, the impinging stream of electrons cooperates with the vacuum to produce a surface having a new degree of cleanliness designated herein as "very clean". A very clean surface is in degree of cleanliness intermediate Ewald's previously mentioned "Pure Surfaces" and "Clean Surfaces." In the method of this invention the vacuum serves to protect the very clean heated surfaces of the strips from atmospheric contamination until after they are bonded by rolling.

In the method of this invention it is essential that the vacuum be maintained continuously between the last cleaning step and the roll bonding. A simple prior art illustration of a "pure surface" which may aid in understanding the unexpected nature and importance of avoiding atmospheric contamination is as follows:

It is known that an iron rod is not wet by mercury unless a pure surface is formed by fracturing the rod while it is submerged in the mercury. Mercury then wets the fractured surface. A rod fractured in air and immediately plunged into mercury is not wetted because gases from air are adsorbed rapidly on the fractured surface of the rod. The generally accepted explanation is that the mercury atoms are held outside the range of the atomic attraction of the iron surface by gases adsorbed from the atmosphere.

It has not been previously recognized that the combination of electron beam heating, cleaning and rolling in a vacuum will simultaneously provide an improved bonding of metals and eliminate major problems inherent in the prior art cladding methods.

BRIEF DESCRIPTION OF THE DRAWING

The drawing is a schematic view of a vertical section of an apparatus with which the method of this invention may be carried out.

DESCRIPTION OF THE PREFERRED EMBODIMENT

Figure 1:
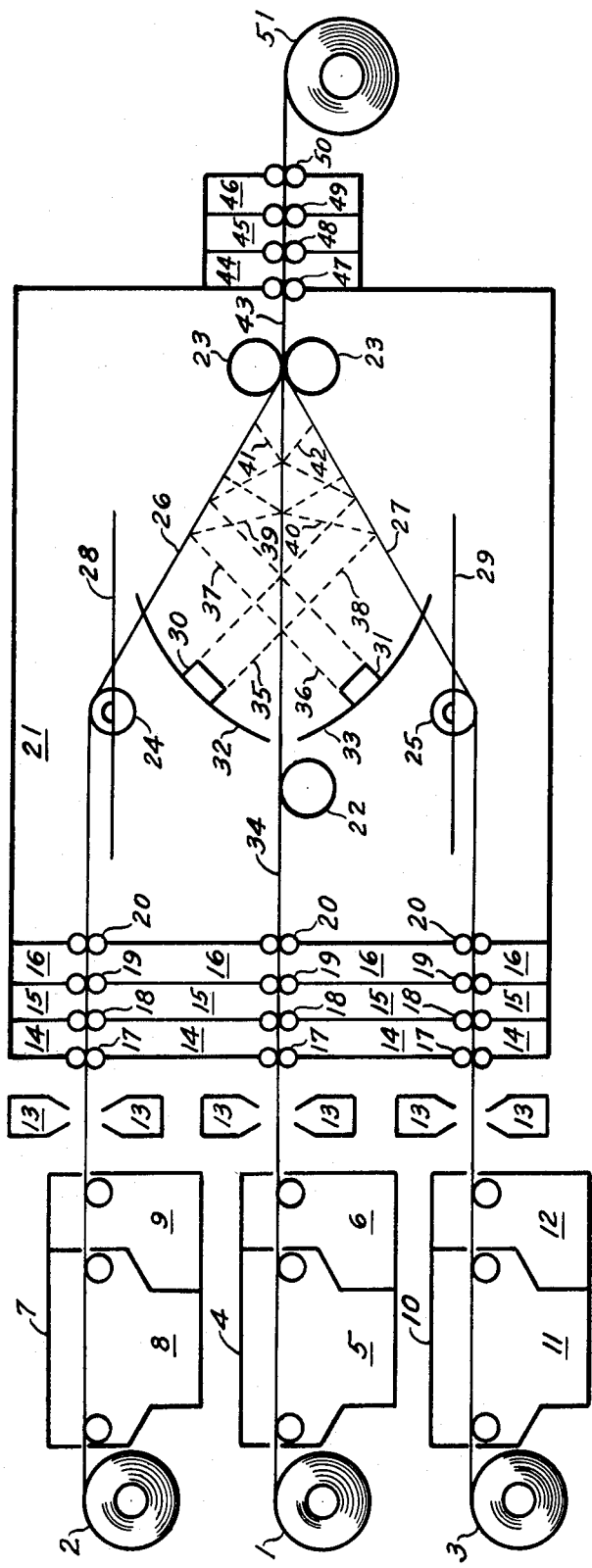

In the drawing, 1 is the payoff reel of a strip of core material 34, 2 and 3 are the payoff reels of a strip of cladding materials 26, 27 respectively, for the top and the bottom sides of the core respectively. Conventional chemical cleaning equipment 4, 7 and 10 includes chemical treatment tanks 5, 8, and 11 and rinse tanks 6, 9 and 12. Chemical treatment tanks 5, 8 and 11 may contain the same or different chemicals depending on the material being cleaned and may be single or multiple units for each strip of material. After rinsing the strips 34, 26 and 27 are dried by air blowers 13 and enter the main vacuum chamber 21 through differently pumped entrance seal chambers 14, 15, and 16 with increasing levels of vacuum as is the standard practice. In progressing from the atmosphere through each seal chamber to the main vacuum chamber 21 the strips pass through conventional sealing devices between the chambers such as pairs of seal rolls 17, 18, 19 and 20. The seal chambers and the main chamber are evacuated by conventional vacuum pumps (not shown) to the desired vacuum levels, for instance, to about 40 torr in the first seal chamber 14, to about 1 torr in the second seal chamber 15, to about $2 \times 10^{-2}$ torr in the third seal chamber 16, and to about $1 \times 10^{-4}$ torr in the main vacuum chamber 21. A carrier roll 22 supports the core strip 34 on its passages through the main vacuum chamber 21 to the two high pressure rolls 23. Deflector rolls 24 and 25 are for the top and bottom cladding material strips 26 and 27 respectively. The deflector rolls may be positioned on tracks 28 and 29 to adjust the entrance angles between the core strip 34 and the respective cladding material strips 26, 27. The strip cleaning electron-beam guns 30 and 31 are positioned on tracks 32 and 33 respectively to vary the impingement angle to the core material of the primary electron beams 35 and 36. The secondary electron beams 37 and 38 are reflected from the core material to the cladding materials; 39 and 40 are the ternary electron beams from the cladding material to the core; 41 and 42 are the quatenary electron beams from the core to the cladding materials. The cleaned and heated core strip 34 comes in contact with top 26 and bottom 27 cladding material as they pass between rolls 23. The clad product 43 exits from the vacuum chamber through exit seal chambers 44, 45, and 46 containing seal devices 47, 48, 49 and 50. The exit seal chambers are differentially pumped as per the entrance seal chambers and may communicate with or be an extension of the entrance seal chambers. The takeup reel 51 accumulates a coil of clad product.

In the method of this invention it is preferable to start with commercially clean strips produced by prior art chemical and solvent cleaning methods. These known methods may include cleaning with chemicals, such as acids, alkalies and detergents as well as solvent cleaning with water, petro chemicals and including halogen derivatives of hydrocarbons.

These known methods of cleaning result in either of the two previously defined degrees of cleanliness at (2) "Clean surfaces" or (3) "Technical surfaces" but neither of these prior art methods will result in very clean surfaces without observing additional precautions, e.g. vacuum treatment.

These strips 34, 26 and 27 having commercially clean surfaces, equivalent to Ewald's (2) Clean surfaces or (3) Technical surfaces, are then introduced into a vacuum chamber 21 at a pressure less than $1.0 \times 10^{-3}$ torr, i.e. $10^{-3}$ mm Hg.

In the vacuum chamber 21, the strips are cleaned and heated by impinging a stream of electrons on adjacent mating surfaces of the strips. A single stream of electrons can service each pair of adjacent mating surfaces by reflecting the stream back and forth between adjacent strip surfaces. This is accomplished by impinging the stream on a first strip surface at an angle of incidence which will reflect a secondary stream to the adjacent surface of a second strip and so on.

In the method of this invention it is preferable to use a stream of electrons from an electron beam gun. A satisfactory commercial type of gun would have a capacity of 10 KV operating at 1.0 amps. of either a self-accelerating type or work-accelerating type. Such an electron beam gun will require that the vacuum chamber 21 be at a higher vacuum, i.e. $10 \times 10^{-4}$ toor, or greater.

By self-accelerated type we mean an electron beam gun in which the electric fields giving energy to the emitted electrons is confined to the vicinity of the electron emitter, whereas by work-accelerated type we mean a device where the electric field is established between the electron emitter and the workpiece itself, i.e., the object to be heated. The only restriction is that the beam be relatively loosely focused so as not to produce too sharp a heating edge and, thus, avoid possible non-uniform strip heating. The self-accelerated type of electron beam gun has the advantage of being easily directed at the strip at a controlled angle of incidence of less than 90° in the direction of the moving strip as shown in the drawing. In our work we used a commercial electron beam gun known as a 10 KW Minigun manufactured by Airco-Temescal Division of Airco Corporation. The gun was placed within a varying magnetic field produced by a sawtooth electric current generator between two Helmholtz coils. This varying magnetic field caused the electron beam to sweep back and forth across the strip at a frequency of approximately 250 hertz.

Depending on the power level and the design of the electron beam heating equipment, a steel strip may be brought from ambient temperature to any temperature as high as may be desired in a length of as little as one-inch, however the preferred range is from 3 to 12 inches. This range allows more ready control of the heating and cleaning operation and eliminates strip tracking problems.

We have further discovered that when the electron beam is directed at the strip at an angle other than perpendicularly to the strip that some of the beam electrons are reflected or diffracted from the strip surface with little or no loss in energy. The energy content of this secondary electron beam is roughly proportional to the acute angle which the primary beam makes with a line perpendicular to the strip surface. Therefore, one electron beam can serve to heat and clean the two mating surfaces of different strips simultaneously. The relative angles between the electron beam and the first strip, and the secondary beam and the second strip being adjusted experimentally to conform with the heating and cleaning requirements of the core and of cladding materials and relative strip thickness involved. This continuous heating and cleaning up to the point of contact between adjacent strip surfaces is desirable because it provides time for conductivity to smooth out irregularities in temperature and eliminates any possibility of contaminating the surfaces of the strips up to the point of cladding.

The electron beam gun should provide a stream of electrons having an energy of at least 15 electron volts which is sufficient energy to decompose surface metal oxides which are the most resistant of possible surface contaminants. In a vacuum environment this heating rapidly drives off any remaining volatile materials and adsorbed gases. In addition, this stream of electrons is effective in breaking the chemical bonds of non-volatile contaminants so that they can be removed from the system by the vacuum. Alternately, some heating could be provided by radiation, by contact with a heated surface, by direct electrical resistance heating or by electrical induction. Such alternate heating would be followed by impinging an electron beam.

The steel substrate (core) of a first metal strip and the cladding material of a second metal strip form a strong bond when they are placed in contiguous contact by passing through the pair of rolls in the vacuum chamber. Increasing the temperature of the substrate and cladding material to above about 900° F. is desirable because the higher temperatures increase atomic mobility and enhance the interdiffusion of atoms between the cladding material and the steel substrate. The upper limit of temperature is close to the melting point of the lowest melting metal material where the metal is no longer self-supporting because of incipient fusion.

roughening steps of the prior art cladding methods are unnecessary. Furthermore, the improved cleanliness of the surfaces of the core and cladding strips provided by the method of this invention facilitates bonding by relatively simple rolling contact and does not require extensive elongation of the length of either the core or cladding material by more than about 3%. In addition, the smooth surface finishes provide greater contact area between core and cladding material which improves the bonding to a degree which is sufficient and subsequent diffusion heat treatment are unnecessary.

Specific examples of cladding steel with a variety of metal strips in the manner of this invention are shown on Table 1. In this Table the core material is an annealed ferrous alloy strip, commonly called black plate, or black plate coated with copper, and the cladding material is commercial strip having compositions as noted. The nominal dimensions of the width and thickness of the core and cladding material are shown in inches and the roughness of the surface finish (R.M.S.) of the core material and cladding material is shown in longitudinal and transverse directions in micro-inches. Specific details on variations of the method of this invention are shown in the columns headed Vacuum (Torr), which is the vacuum in the main vacuum chamber 21; Strip Speed (Inches per Minute), which is the speed of the core material through the vacuum chamber 21; and Electron Beam (Kilovolts and Amperes). The temperature attained by the core as a result of the impingement of the electron beam is shown under the heading Core Temperature ° F., and the heading Elongation, Percent shows the extent of elongation of the core and cladding materials as a percent increase in length.

The method of this invention has been used satisfactorily to continuously clad smooth, bright steel strip, i.e. black plate, on one side with the cladding material listed in the above Table. A satisfactory bond was provided with no more than 1% elongation of the core on non-driven two high pressure rolls in which the take-up reel was driven and tension on the strips was produced by friction brakes on the payoff reels.

TABLE 1

| | Core Material | | | | | Cladding Material | | | |
|---|---|---|---|---|---|---|---|---|---|
| Ex. No. | Composition | Thickness Inches | Width Inches | Surface Finish Microinches R.M.S. | | Composition | Thickness Inches | Width Inches | Surface Finish Microinches R.M.S. |
| | | | | (Long.) | (Trans.) | | | | (Long.) (Trans.) |
| 1 | Black Plate | .010" | 4" | 15 -17 | 17 -20 | 90%Cu-10%Zn | .010" | 2" | 3 -5    3 -5 |
| 2 | Black Plate | .010" | 4" | 15 -17 | 17 -20 | Steel Foil | .0021" | 3¾" | —    — |
| 3 | Black Plate | .010" | 4" | 14 -17 | 17 -20 | Aluminum | .003" | 4" | —    — |
| 4 | Copper Coated Black Plate | .014" | 4" | 6 -8 | 21 -23 | Copper on Steel | .014" | 4" | 6 -8    21 -23 |
| 5 | Copper Coated Black Plate | .014" | 4" | 6 -8 | 21 -23 | 95%Cu-Cu-5%Zn | .005" | 3¾" | 3 -5    3 -5 |
| 6 | Black Plate | .010" | 4" | 14 -17 | 17 -20 | Aluminum | .003" | 4" | —    — |

| Ex. No. | Vacuum Torr | Strip Speed Inches/Min. | Electron Beam KV. | AMPS. | Core Temp. ° F. | Max. Elongation Percent Core | Cladding |
|---|---|---|---|---|---|---|---|
| 1 | 2.0 × 10⁻⁴ | 1 | 10 | 0.50 | — | 1.0 | 0.0 |
| 2 | 3.0/5.0 × 10⁻⁴ | 1-6 | 10 | 0.1-1.0 | 1500-2200 | 0.0 | 0.0 |
| 3 | 4.0 × 10⁻⁴ | 6 | 10 | 0.25 | 1400 | 1.0 | 1.0 |
| 4 | — | 60 | 10 | 0.6-1.0 | 1700-2000 | 1.0 | — |
| 5 | 1.8 × 10⁻⁴ | 33 | 10 | 0.25 | — | 0.0 | 0.0 |
| 6 | 4.6 × 10⁻⁴ | 6-8 | 10 | 0.25 | 1300 | 0.5 | 3.0 |

The bonding of core and cladding materials by the bonding method of this invention can be accomplished with unusually smooth surface finishes, e.g. less than 25 micro-inch R.M.S. is satisfactory, and good bonding has been attained with surface finishes on the order of 3 to 5 microinches R.M.S. This means that the surface

We claim:
1. A method for vacuum cladding a first metal strip with a second strip of a different metal, comprising:

1. A method comprising:
   a. providing the adjacent surfaces of the metal strips with a surface finish of less than 25 microinch R.M.S.,
   b. introducing the metal strips into a vacuum chamber,
   c. maintaining a pressure in the vacuum chamber not higher than $1 \times 10^{-3}$ Torr,
   d. impinging the adjacent surfaces of the strips in the vacuum chamber with a stream of electrons having sufficient force to provide strips heated to below the temperature of incipient fusion and with very clean, adjacent surfaces, and
   e. placing the very clean, adjacent surfaces of the heated strips into contiguous contact between at least one pair of rolls operating in the vacuum to bond the first metal strip with the second metal strip and produce a strip of clad metal.

2. The method of claim 1 wherein the first metal strip is steel and the second strip is selected from the group of metals consisting of aluminum and its alloys and copper and its alloys.

3. The method of claim 1 wherein the stream of electrons of step (d) is produced by an electron beam gun, 4. The method of claim 4 wherein the electron beam gun provides a stream of electrons having an energy of at least 15 electron volts.

5. The method of claim 1 further including the step of
   f. tensioning the heated strips in the vacuum chamber to increase the finished length of the strips not more than 3%.

6. The method of claim 1 further including the step of
   g. applying pressure on the heated strips through said pair of rolls to increase the finished length of the clad metal strip not more than 3%.

7. The method of claim 1 wherein the stream of electrons of step (d) initially impinges an adjacent surface of the first metal strip at an angle of incidence which will reflect a secondary stream of electrons so as to impinge an adjacent surface of the second strip.

8. A method of cladding a first steep strip with a second metal strip wherein the method comprises:
   a. providing the adjacent surfaces of the metal strips with a surface finish of less than 25 microinch R.M.S.,
   b. introducing the first and second strips into a vacuum chamber,
   c. maintaining a pressure in the vacuum chamber not higher than $1 \times 10^{-3}$ Torr,
   d. simultaneously heating and cleaning the first and second strips in the vacuum chamber with a stream of electrons having sufficient energy to heat the strips to a temperature in the range between about 900° F. and the temperature at which the second strip is no longer self-supporting because of incipient fusion so as to provide heated strips having very clean surfaces,
   e. bringing the very clean surfaces of the heated strips into contact with one another between at least one pair of rolls so as to bond the first strip and the second strip together, and
   f. moving the bonded strips from the vacuum to an ambient atmosphere.

9. A method of cladding steel strip with a strip of a different metal wherein the method comprises:
   a. providing a first strip of steel and a second strip of a different metal,
   b. providing the adjacent surfaces of the metal strips with a surface finish of less then 25 microinch R.M.S.,
   c. maintaining a pressure in the vacuum chamber not higher than $1 \times 10^{-3}$ Torr,
   d. heating the first and second strips in a vacuum chamber to a temperature in the range between about 900° F. and the temperature at which the second strip is no longer self-supporting because of incipient fusion so as to provide heated first and second strips having clean surfaces and simultaneously cleaning the heated, clean surfaces with a stream of electrons to loosen chemically bonded and adhering contaminants on the surfaces of the first and second strips so that the vacuum will remove the contaminants and provide heated first and second strips having very clean surfaces,
   e. bringing the very clean surfaces of the heated first and second strips into contact with one another between at lease one pair of rolls within the vacuum chamber to bond the first and second strips together, and
   f. moving the bonded strips from the vacuum to an ambient atmosphere.

10. Method of claim 9 wherein a single electron beam cleans adjacent surfaces of the strips being bonded together.

* * * * *

UNITED STATES PATENT OFFICE
CERTIFICATE OF CORRECTION

PATENT NO. : 4,041,273
DATED : August 9, 1977
INVENTOR(S) : Herbert H. Francisco, et al.

It is certified that error appears in the above-identified patent and that said Letters Patent are hereby corrected as shown below:

Col. 1, line 2, "clapped" should read --cladded--.

Col. 1, line 18, "evaporator" should read --evaporation--

Table I, under "Composition", line 7, "Cu" should be omitted --it should read --95% Cu - 5% Zn--.

Col. 7, claim 8, line 42, "steep" should read --steel--.

Col. 7, line 25, claim 4 "claim 4" should read --claim 3--.

Signed and Sealed this

Tenth Day of January 1978

[SEAL]

Attest:

RUTH C. MASON
Attesting Officer

LUTRELLE F. PARKER
Acting Commissioner of Patents and Trademarks